UNITED STATES PATENT OFFICE.

THOMAS G. BLACKLOCK, OF NEW YORK, N. Y., ASSIGNOR TO BLACKLOCK MILLING COMPANY, INCORPORATED, A CORPORATION OF NEW YORK.

PROCESS FOR MAKING DOUGH.

1,203,176.    Specification of Letters Patent.    Patented Oct. 31, 1916.

No Drawing.    Application filed May 6, 1916. Serial No. 95,780.

*To all whom it may concern:*

Be it known that I, THOMAS G. BLACK-LOCK, a citizen of the United States, and a resident of the borough of Brooklyn, city of New York, county of Kings, and State of New York, have invented a new and useful Improvement in Processes for Making Dough, of which the following is a specification.

One object of my invention is to provide a novel process for making dough whereby it shall be possible to utilize relatively large quantities of stale bread without injuriously affecting the quality of the bread made from the same.

It is further desired to provide a process which shall result in a mixture having a greater water absorbing capacity than has hitherto been found in dough forming mixtures, the invention also contemplating a novel combination of ingredients which shall possess a materially greater activity of fermentation than has hitherto been obtainable.

Another object of my invention is to provide a process having the above characteristics whereby it shall be possible to produce a given quantity of dough of high quality at a relatively lower cost than has hitherto been considered possible and by the use of a novel combination of ingredients.

In carrying out my invention I intimately mix the following materials in substantially the proportions indicated, viz: To each barrel of flour I add twenty to one hundred pounds of stale bread in a finely divided form, about two pounds of yeast, about three and one-half pounds of sugar, about three and one-half pounds of salt, from one and one-half to three pounds of shortening (lard or its equivalent), and from one to four pounds of dextrose sugar with the water necessary to make a dough of the proper consistency.

I have found that a mixture of the above ingredients possesses the power of absorbing a greater proportion of water without "slacking off," than any other combination of materials with which I am familiar, and by the term "slacking off" I mean such a soft condition of the dough as would prevent it being properly manipulated by hand or machinery to form loaves.

After the above mixture has been subjected to the action of a dough mixer for a suitable time and has supplied to it suitable quantities of water, the resulting dough is treated in the well known manner to form bread.

It is to be noted that the use of stale bread in my process is made possible mainly by the employment of the dextrose sugar, since this compound with the yeast apparently revives or continues the fermentation of certain of the substances present in the stale bread, and results in a product which for all practical purposes is substantially identical with that resulting from the action of the yeast on flour.

The above described dough is used for making bread, and I have found that when it is desired to make dough of the so-called "sweet" variety this may be done in a novel manner with great economy of yeast, by merely adding a relatively small quantity of the above described bread dough to a mixture containing the following ingredients in substantially the proportions noted; namely; 10 qts. of water, ¼ pound of salt, 4 pounds of shortening, 3 pounds of sugar, 1 pound of dry milk, 8 oz. of dextrose sugar, from 3 to 7 pounds of flour, and from 3 to 7 pounds of stale bread. To a mixture of the above substances should be added about 1 pound of bread dough made as above described, after which the resulting compound is mixed and made up in the ordinary manner with as much water as it will absorb without slacking off, it being noted that the quantity of such water is materially greater than could ordinarily be used.

One advantage of my invention is that in making up a batch of dough, a relatively small quantity of dough retained from a preceding batch may be utilized in place of the compressed or other yeast indicated in the above formula for bread, this being possible by reason of the greatly increased activity of fermentation resulting from the use of the dextrose sugar. Obviously by this means material economy in the cost of making the dough will result.

It is to be understood that the formulas and quantities above given are merely typical and that wide departures may be made from them without departing from my invention.

I claim:

1. The process which consists in intimately mixing dough forming ingredients with stale bread and dextrose sugar, and thereafter forming bread from the resulting composition.

2. The process which consists in intimately mixing flour, stale bread, dextrose sugar, shortening, salt, sugar and a body of yeast with water to form dough and thereafter making bread from the same.

3. The process which consists in intimately mixing flour, stale bread, dextrose sugar, shortening, salt, sugar and a fermenting agent with water to form dough, and thereafter making bread from the resulting mixture.

4. As a new article of manufacture a dough containing bread forming ingredients intimately mixed with stale bread, dextrose sugar, and a body of previously made dough.

5. As a new article of manufacture a dough containing flour, stale bread, dextrose sugar, shortening, salt, sugar, and a fermenting agent.

6. As a new article of manufacture a dough containing bread-forming ingredients intimately mixed with stale bread, dextrose sugar, and a fermenting agent.

Dated this 29th day of April, 1916.

THOMAS G. BLACKLOCK.